United States Patent
Aratani

[11] Patent Number: 5,880,707
[45] Date of Patent: Mar. 9, 1999

[54] DISPLAY CONTROL APPARATUS AND METHOD

[75] Inventor: Shuntaro Aratani, Kawasaki, Japan

[73] Assignee: Canon Kabushiki Kaisha, Tokyo, Japan

[21] Appl. No.: 545,893

[22] Filed: Oct. 19, 1995

[30] Foreign Application Priority Data

Oct. 20, 1994 [JP] Japan .................................... 6-281282

[51] Int. Cl.$^6$ ...................................................... G09G 3/36
[52] U.S. Cl. ............................ 345/100; 345/98; 345/103; 348/792
[58] Field of Search ................................ 345/87, 147, 89, 345/186, 189, 190, 98, 97, 100, 103, 507, 509, 515; 348/790, 791, 792, 793

[56] References Cited

U.S. PATENT DOCUMENTS

| | | | |
|---|---|---|---|
| 4,484,187 | 11/1984 | Brown et al. ............................ | 345/186 |
| 4,574,277 | 3/1986 | Krause et al. ........................... | 345/186 |
| 4,665,556 | 5/1987 | Fukushima et al. .................... | 382/304 |
| 5,130,819 | 7/1992 | Ohta ........................................ | 358/445 |
| 5,579,057 | 11/1996 | Banker et al. .......................... | 345/129 |

FOREIGN PATENT DOCUMENTS

| | | |
|---|---|---|
| 0529701 | 3/1993 | European Pat. Off. . |
| 0537428 | 4/1993 | European Pat. Off. . |
| 0592801 | 4/1994 | European Pat. Off. . |

*Primary Examiner*—Xiao Wu
*Attorney, Agent, or Firm*—Fitzpatrick Cella Harper & Scinto

[57] ABSTRACT

Disclosed are a display control apparatus and method for controlling the display of a matrix display panel. An image displayed on an FLC panel, for example, is partitioned into a plurality of bands each composed of a plurality of lines of image data, non-interlaced scanning is performed within one band obtained by partitioning, interlaced scanning is performed in band units, and the scanning direction of a first band and the scanning direction of a second band neighboring the first band are made the opposite of each other. As a result, it is possible to prevent a decline in image quality after half-tone processing as well as the occurrence of flicker caused by crosstalk peculiar to matrix displays.

18 Claims, 15 Drawing Sheets

FIG. 3

|  | i−2 | i−1 | i | i+1 | i+2 |
|---|---|---|---|---|---|
| j |  |  | * | 2 | 1 |
| j+1 | 1 | 1 | 2 | 1 |  |

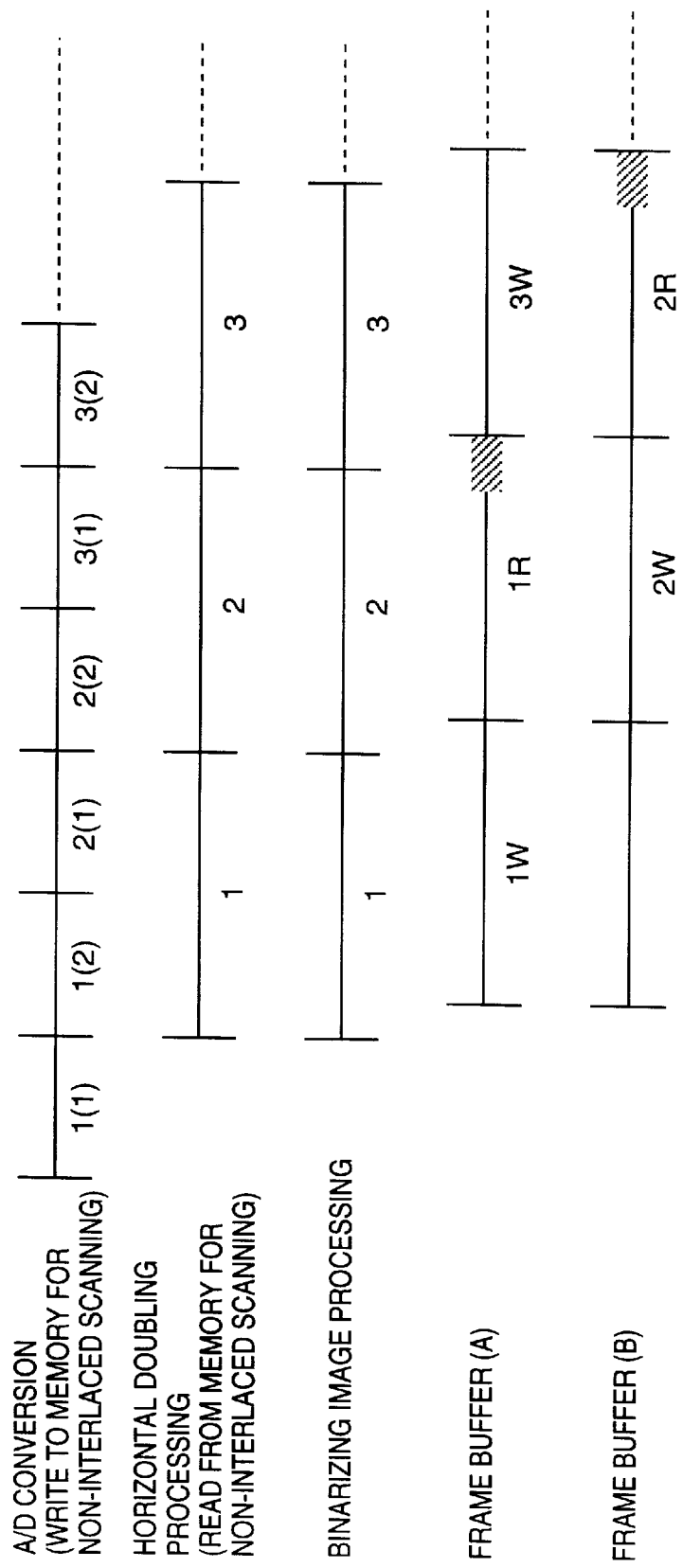

FIG. 5C (INPUT DATA) − (BINARY DATA) = ERROR

DISPLAY CONTROL APPARATUS AND METHOD

BACKGROUND OF THE INVENTION

1. Field of the Invention

This invention relates to a display control apparatus and method. More particularly, the invention relates to a display control apparatus and method for a display equipped with, e.g., ferroelectric liquid crystal serving as an operating medium for display update, wherein the state of a display updated as by application of an electric field is capable of being retained.

2. Description of the Related Art

Recent advances in increasing computer processing speed have made it possible to apply computers in a variety of fields in which such application was not feasible in the past. Computers can now be used as the nucleus in multimedia systems in which such media as CDs (compact disks), TV (television) and video tape, etc.

This has been accompanied by the need for specifications for accommodating multimedia in flat-panel displays typified by liquid-crystal displays. For example, in order to display a TV picture or a picture from video tape, the number of display colors desired is at least 260,000.

A ferroelectric liquid-crystal display (hereinafter referred to as an "FLCD") using ferroelectric liquid crystal (hereinafter referred to as "FLC") differs from other types of liquid-crystal displays in that it possesses a "memory" capability. This means that the liquid crystal has a characteristic which allows it to retain the state of a display changed by application of an electric field. By virtue of the memory capability, a display device using FLC suffers no decline in contrast regardless of the number of scanning lines, thus making it possible to realize a large-screen, high-definition display. This feature has been exploited to apply FLCDs to displays in DTP (desktop publishing) systems. With an FLCD panel, however, only two states, namely light and dark, can be expressed by a single pixel. In a case where an image, such as a TV image, containing many gray levels and colors is displayed, it is necessary to execute binary digital processing typified by error diffusion processing and to combine a plurality of pixels to increase the number of grays and the number of colors.

The applicant has previously proposed techniques for displaying images binarized by the error diffusion method. For example, see the specifications of CFM501US (application Ser. No. 08/246,720, filed on May 20, 1994); CFM502US (application Ser. No. 08/243,929, filed on May 17, 1994); CFM503US (application Ser. No. 08/248,511, filed on May 24, 1994); CFG118US (application Ser. No. 08/246,724, filed on May 20, 1994); CFO9174US (application Ser. No. 08/061,026, filed on May 15, 1993); and CFO9177US (application Ser. No. 08/062,214, filed on May 18, 1993).

Error diffusion processing involves an operation of the kind shown in FIG. 17. Specifically, the difference in density between input multivalued pixel data and binary data obtained by binarizing the input data is diffused to the input data of neighboring pixels to be processed subsequently, with weighting being applied to these pixels. Density is preserved. Though the number of colors that can be expressed on the FLCD by error diffusion processing is increased, a decline in image quality and resolution with respect to the original image is unavoidable. Accordingly, in order to improve image quality and resolution when a TV picture is displayed using an FLCD, it is required that first and second fields of an NTSC image signal sent at 2:1 interlacing be combined to produce one frame, after which non-interlaced error diffusion processing is executed.

However, even if error diffusion processing is carried out in frame units, image quality deteriorates when 2:1 interlaced scanning according to the NTSC is used as the scanning method in presenting a display on an FLCD. The reason for this is that since error diffusion processing diffuses error to a neighboring line (the bottom line in the example of FIG. 17), an image in which error is not diffused correctly is displayed for a certain period of time when one line is skipped by interlacing.

The situation is as illustrated in FIG. 18, in which F1 and F2 represent items of binarized frame data obtained by error diffusion processing, with F1 being a first frame of binary data and F2 being a second frame of binary data. When these are subjected to 2:1 interlaced scanning, the content of the display changes in the manner shown at (a), (b), (c), (d) in FIG. 18. In the state shown at (c), the second field of the first frame and the first field of the second frame mix together and a lower line to which error should be diffused does not exist regardless of the field. The result is poor expression of half-tones and an extremely unattractive image. Thus, when binary data that has been subjected to error diffusion processing in frame units is displayed on an FLCD, a problem in terms of image quality arises with 2:1 interlaced scanning. For this reason, it has been construed heretofore that better image quality is obtained when a display is presented using non-interlaced scanning.

Generally, when non-interlaced scanning is performed at a frequency of less than 50 Hz using a CRT, flicker is produced. With an FLCD, on the other hand, there is comparatively little flicker, even when non-interlaced scanning is performed at less than 30 Hz, owing to the aforementioned memory capability of FLC. However, when non-interlaced scanning is carried out, crosstalk that is peculiar to a matrix display occurs depending upon the pattern displayed and, as a result, some fluctuation in luminance occurs at 30 Hz. This can lead to even more flicker than is encountered with a CRT.

SUMMARY OF THE INVENTION

An object of the present invention is to eliminate the aforesaid shortcomings of the prior art and provide a display control apparatus and method through which a deterioration in image quality and the occurrence of flicker are suppressed so that a high-definition image can be displayed.

Another object of the invention is to provide a display control apparatus and method in which an image is divided into a plurality of groups and the scanning directions of a first group and a second group neighboring the first group are made the opposite of each other, thereby preventing the occurrence of crosstalk peculiar to a matrix display as well as the occurrence of flicker.

A further object of the invention is to provide a display control apparatus and method in which an image is divided into a plurality of groups and the scanning directions of a first group and a second group neighboring the first group are made the opposite of each other, whereby a line which is the boundary between the frame of an immediately preceding picture and a current frame can be changed constantly so that it is possible to prevent an image from being displayed in a broken or intermittent manner.

Still another object of the invention is to provide a display control apparatus and method in which the occurrence of flicker is prevented, an image is divided into a plurality of line groups and non-interlaced scanning is performed within each group, as a result of which it is possible to display an attractive image after half-tone processing or error diffusion processing.

According to the present invention, the foregoing objects are attained by providing a display control apparatus comprising a display control apparatus comprising input means for entering image data, memory means for storing the entered image data, partitioning means for partitioning the image data stored in the memory means into a plurality of bands each composed of a plurality of lines of image data, and scanning means for performing non-interlaced scanning within one band obtained by partitioning and performing interlaced scanning in band units, wherein the scanning means makes the scanning direction of a first band and the scanning direction of a second band neighboring the first band the opposite of each other.

Further, the foregoing objects are attained by providing a display control method comprising a display control method comprising an input step of entering image data, a storing step of storing the entered image data, a partitioning means for partitioning the image data stored at the storing step into a plurality of bands each composed of a plurality of lines of image data, and a scanning step of performing non-interlaced scanning within one band obtained by partitioning and performing interlaced scanning in band units, wherein the scanning step makes the scanning direction of a first band and the scanning direction of a second band neighboring the first band the opposite of each other.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 is a diagram showing an error diffusion matrix;

FIG. 4 is a timing chart showing the operating times of an A/D converting circuit, a horizontal doubling circuit and an image processing circuit, which are controlled by a timing controller shown in FIG. 1;

FIGS. 5A to 5C are diagrams showing the driving waveforms of an FLCD panel;

DESCRIPTION OF THE PREFERRED EMBODIMENTS

Preferred embodiments of the present invention will now be described in detail with reference to the drawings.

Figure 1:
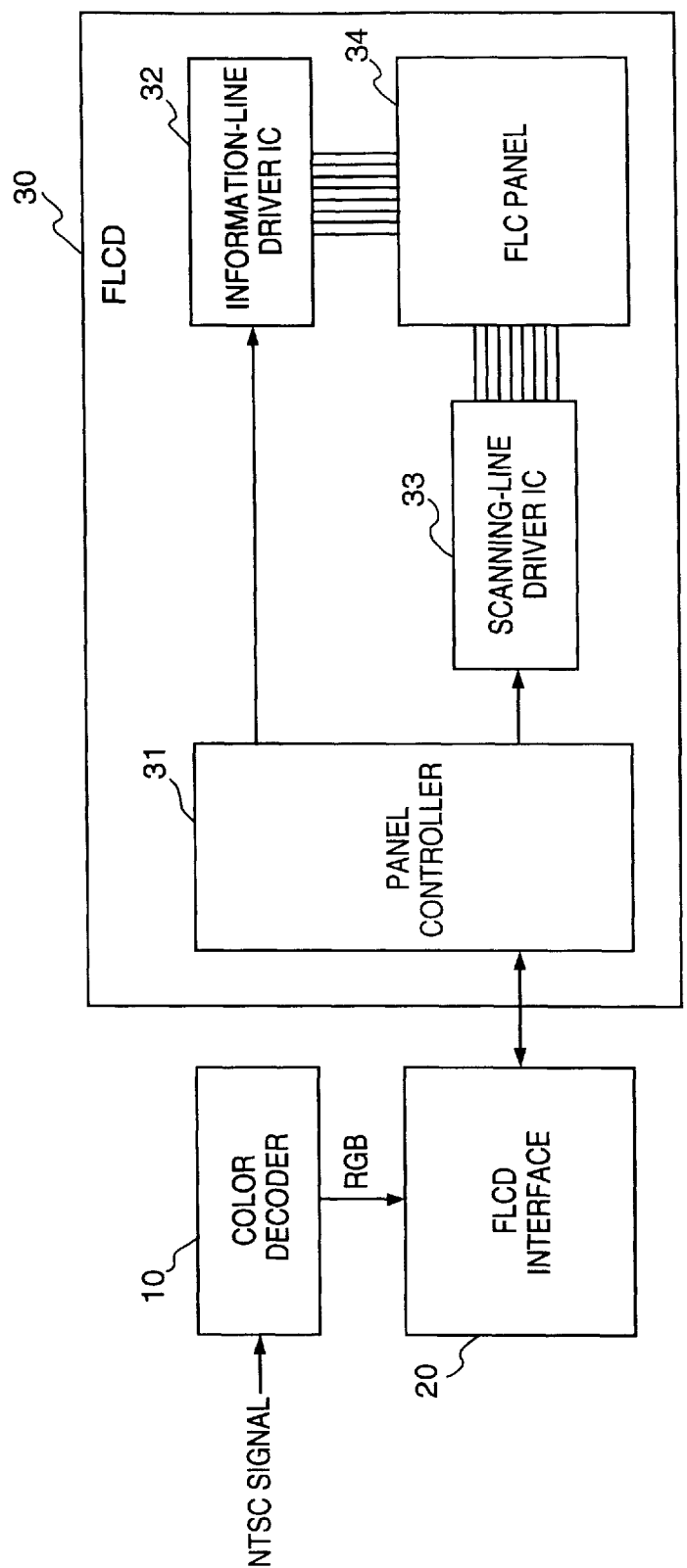
FIG. 1 is a block diagram showing the entirety of a TV display system to which the display control apparatus of an embodiment of the present invention has been applied.

FIG. 1 is a block diagram showing a TV display system to which the display control apparatus of an embodiment of the present invention has been applied. The apparatus includes a ferroelectric liquid-crystal display (FLCD) 30 having an FLC panel 34. The latter includes two glass plates provided with a matrix array of electrodes and subjected to an alignment treatment, and a ferroelectric liquid crystal sealed between the glass plates. The information electrodes and scanning electrodes of the panel 34 are connected to driver ICs 32, 33, respectively. Numeral 31 denotes a panel controller for controlling panel drive.

In this embodiment, a conventional computer display for DTP or the like is employed as is as the FLCD 30. The specifications of the panel 34 are a panel size of 15 inches and a resolution of 1024 pixels vertically and 1280 pixels horizontally. One pixel is divided into sub-pixels of R, G, B, W color filters. Therefore, by combining the lighting of sub-pixels, 16 colors can be displayed by one pixel. According to the NTSC system, which is the TV system employed in Japan, the number of scanning lines is 525. When a display is presented by a matrix display device, generally the display is formed by 640 pixels horizontally and 480 pixels vertically. Accordingly, in a case where a display is presented on an FLCD of 1280 pixels horizontally and 1024 pixels vertically, an image composed of 640 pixels horizontally and 480 pixels vertically is displayed upon being doubled in each of the horizontal and vertical directions.

In FIG. 1, a color decoder 10 converts an NTSC video signal to an RGB video signal of 640 pixels horizontally and 480 pixels vertically. An FLCD interface 20 converts the RGB video signal to an FLCD signal.

Figure 2:
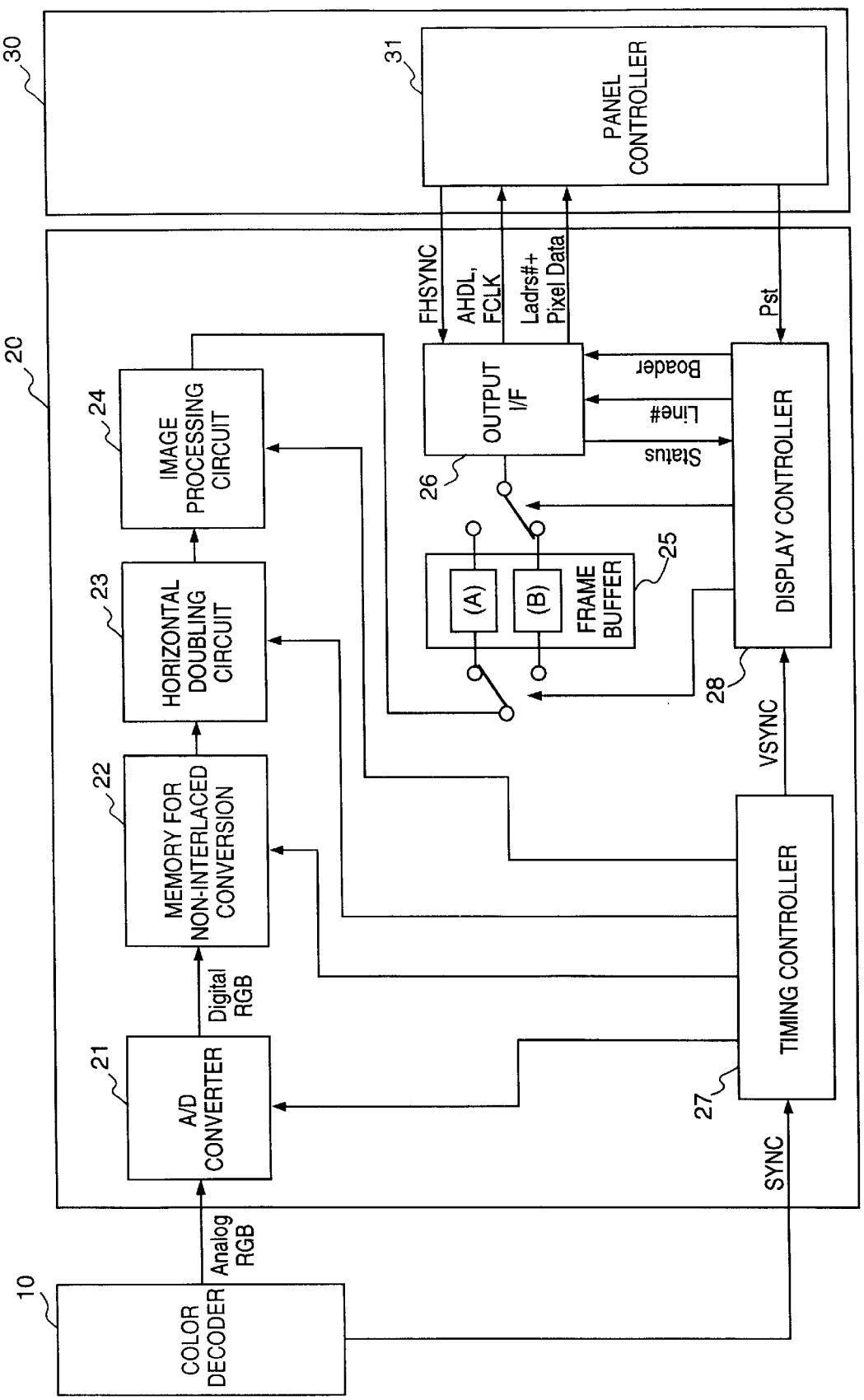
FIG. 2 is a block diagram showing an example of the construction of an FLC interface in FIG. 1.

FIG. 2 is a block diagram showing the construction of the FLCD interface. The analog RGB signal outputted by the color decoder 10 first enters an A/D converter 21, where it is converted to 640 (horizontal)×480 (vertical) RGB digital data of six bits per color. The RGB digital data is stored temporarily in a memory 22 for non-interlaced conversion and then read out after first and second fields are combined, whereby non-interlaced digital frame data is created. The digital frame data is enlarged by a factor of two only in the horizontal direction by a horizontal doubling circuit 23 so as to conform to the 1280 pixels in the horizontal direction of the FLC panel 34 used in this embodiment.

Figure 3:
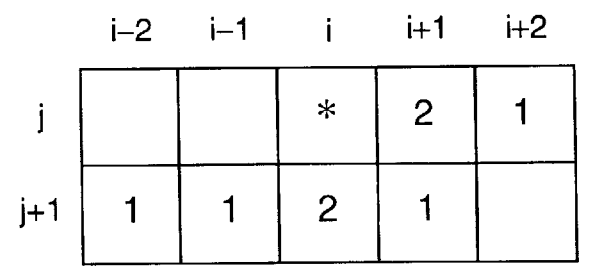

The 1280 (horizontal)×480 (vertical) digital frame data resulting from the horizontal doubling processing is subjected to error-diffusion binarizing processing by an image processing circuit 24 and converted to four-bit (one bit per R, G, B, W) pixel data capable of being displayed on the FLCD 30. FIG. 3 illustrates an error diffusion matrix used in the error-diffusion binarizing processing executed by the image processing circuit 24. The error diffusion matrix diffuses the error, which accompanies binarization of a pixel of interest indicted by "j", to neighboring pixels based upon the weighting coefficients indicated by the numerals.

Let F represent the original image and let B represent a value after binarization. An error F(i,j)−B(i,j) between the original image and the binarized value is diffused to neighboring pixels via the error diffusion matrix shown in FIG. 3. More specifically, if D represents the difference between original image data and binarized data, then neighboring original image data F'(x,y) after error diffusion is as follows:

$$F'(i+1,j) = F(i+1,j) + D \times \tfrac{2}{8}$$

$$F'(i+2,j) = F(i+2,j) + D \times \tfrac{1}{8}$$

$$F'(i-2,j+1) = F(i-2,j+1) + D \times \tfrac{1}{8}$$

$$F'(i-1,j+1) = F(i-1,j+1) + D \times \tfrac{1}{8}$$

$$F'(i,j+1) = F(i,j+1) + D \times \tfrac{2}{8}$$

$$F'(i+1,j+1) = F(i+1,j+1) + D \times \tfrac{1}{8}$$

In order to create the RGBW four-bit/pixel data, the image processing circuit 24 of this embodiment takes the error D as being the distance from the coordinates of the original image F in three-dimensional RGB space to the coordinates of the nearest color among the 16 colors capable of being displayed by the FLCD 30. The RGB components of this error, namely Dr, Dg, Db, are diffused in each of the R, G, B planes, respectively, via the above-mentioned error diffusion matrix.

The digital frame data put into the form of the four-bit/pixel data by the error-diffusion binarizing processing of the image processing circuit 24 is stored in a frame buffer 25. The latter has a so-called double buffer construction that makes it possible to store two frames of data. When data is being read out of buffer (A) of the frame buffer 25 in FIG. 2, data is written to the buffer (B); when data is being read out of buffer (B), data is written to the buffer (A). Thus, the content of the memory is prevented from being rewritten during the display of one frame. Control for changeover between the buffers of frame buffer 25 is carried out by a display controller 28, described later.

An output I/F 26 reads one line of display data out of the frame buffer 25, joins this data with scanning-line address information indicating which scanning line is to be displayed and transfers the result (Ladrs#+Pixel Data in FIG. 2) to the panel controller 31. FCLK represents a timing clock necessary at the time of the transfer, and AHDL represents a signal which indicates whether data on a data line is scanning-line address information or display data. Which scanning-line display data is read out by the output I/F 26 is decided by the display controller 28 and the display controller 28 so instructs the output I/F 26 (Line # in FIG. 2).

The panel controller 31 displays the display data, which has been sent to it, on the scanning line corresponding to the scanning-line address information. By thus transferring data to which the scanning-line address has been attached, the display controller 28 is capable of freely controlling the scanning of the FLC panel 34. It should be noted that the panel controller 31 scans 1024 scanning lines of the FLCD two lines at a time simultaneously. Accordingly, the 1280× 480 data read out of the frame buffer 25 is displayed on substantially the entire surface of the FLCD 30 used in this embodiment. (For the sake of convenience, one line of the two simultaneously driven lines will be considered below, and therefore the FLC panel 34 used in this embodiment is considered to be 1280 horizontally×480 vertically.) Further, though 32 (512−480) scanning lines remain in the vertical direction, the scanning of this area (the border areas) is performed by the output I/F 26 outputting the border data (usually black) and the scanning-line address information in response to the instruction (Boarder in FIG. 2) from the display controller 28.

Since the FLCD 30 has a scanning speed that is dependent upon temperature, it is required that a data-transfer synchronizing signal be outputted from the side of the FLCD 30. Accordingly, the panel controller 31 supplies the display controller 28 with a synchronizing signal (FHSYNC) for when one scanning line of data is transferred and a panel status signal (Pst in FIG. 2), which indicates the present scanning speed of the FLC panel 34.

On the basis of a synchronizing signal (SYNC in FIG. 2) separated by the color decoder 10, a timing controller 27 controls the operating timing of the A/D converter 21, the writing/reading of the memory 22 for non-interlaced conversion, and the operating timing of the horizontal doubling circuit 23 and image processing circuit 24. The timing controller 27 further outputs a synchronizing signal (VSYNC in FIG. 2) to the display controller 28 and notifies the display controller 28 of the end of the processing of one frame in the image processing circuit 24.

FIG. 4 illustrates the operating timing of the A/D converter 21, horizontal doubling circuit 23 and binarizing image processing of the image processing circuit 24, which are controlled by the timing controller 27, as well as changeover timing of the frame buffer 25 performed by the display controller 28. In FIG. 4, the numerals represent frame numbers, the numerals within the parentheses indicate the first and second frames of the video signal, W denotes writing, R denotes reading and the hatched portions are the periods during which the border data is outputted.

Read-out of data from the memory 22 for the non-interlaced conversion begins after a delay of a half frame from the start of writing to the memory 22 from the A/D converter 21. As a result, horizontal doubling processing and image processing can be executed in frame units. Further, the writing of data to the frame buffers (A), (B) is changed over at the moment one frame of image processing in the image processing circuit 24 ends. Changeover of read-out from the frame buffers to the FLCD 30 also is carried out at the same time. When output of one frame to the FLCD 30 ends, the scanning of the border area is performed from this time until the next frame.

Figure 5A:
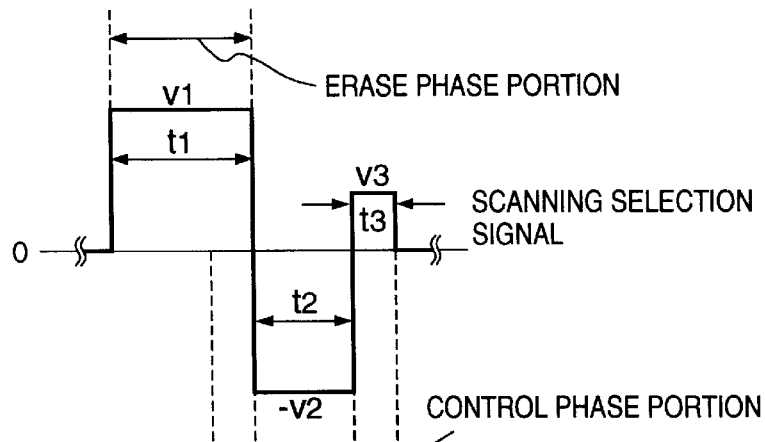
Figure 5B:
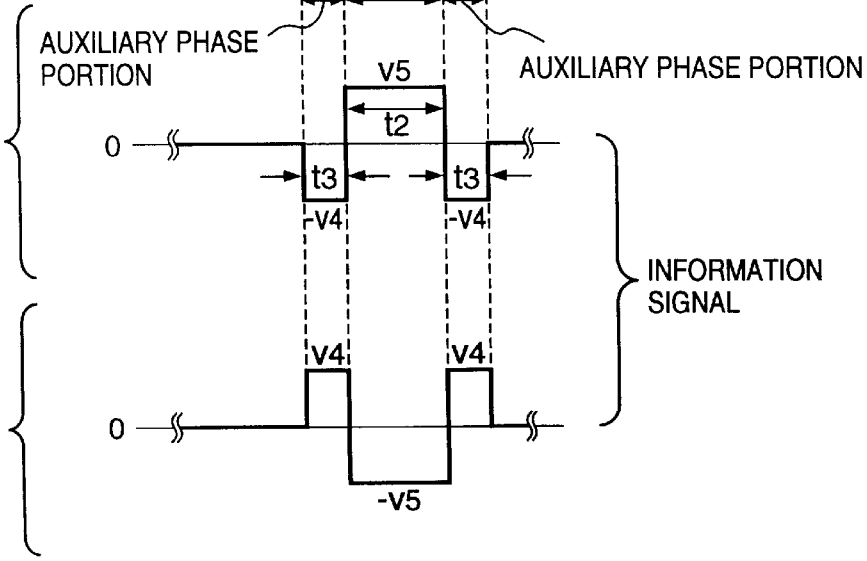

FIGS. 5A to 5C illustrate the driving waveforms of the FLC panel 34 used in this embodiment. FIG. 5A shows the waveform of a scanning selection signal, and FIGS. 5B and 5C illustrate the waveforms of information signals corresponding to "white" and "black" image information. In FIG. 5B, a phase of pulse width t2 and voltage value V5 is a control phase, and a phase of pulse width t3 and voltage value −V4 is an auxiliary phase. The waveform of the scanning selection signal in FIG. 5A is constituted by a erase phase of pulse width t1 and voltage value V1 and an auxiliary phase of pulse width t3 and voltage value V3, namely a phase which compensates for the auxiliary phase of the control signal. It is desired that the voltage value V3 fall within the range 0<V3<V1 and that the relation |V3|= |V4| hold. The pixels on a scanning line selected by the erase phase should be erased to the black state all at once.

Figure 6:
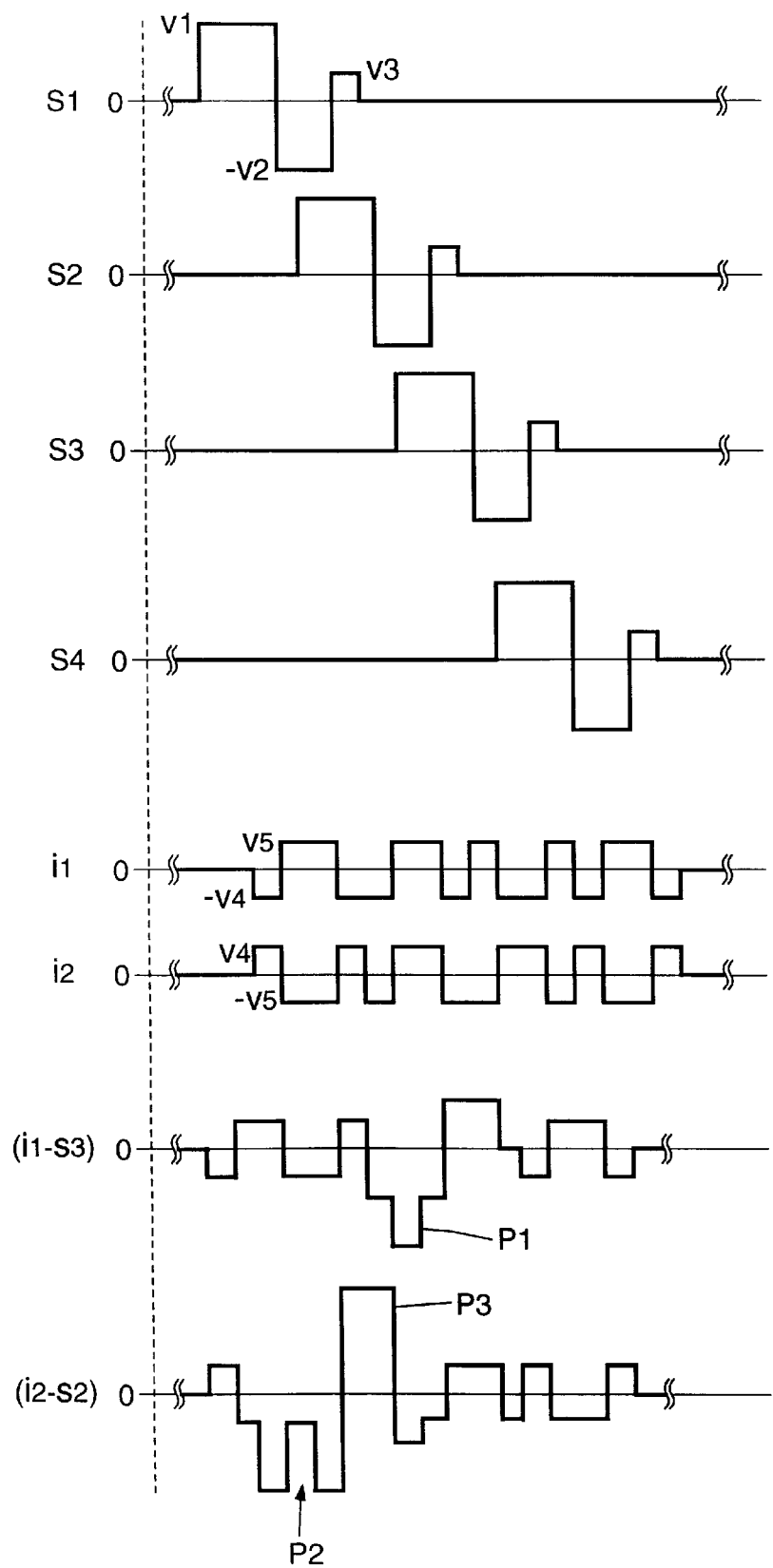
FIG. 6 is a diagram showing time-series waveforms when light and dark patterns in FIG. 7 are displayed.
Figure 7:
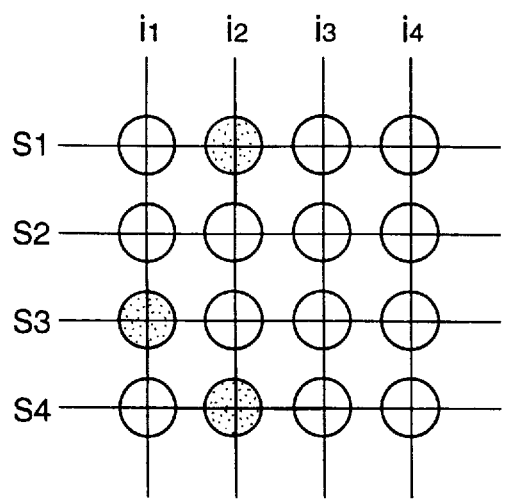
FIG. 7 is a diagram showing light and dark patterns corresponding to FIG. 6.

FIG. 6 is a diagram showing time-series waveforms when a display of the kind depicted in FIG. 7 is presented. In FIG. 6, S1~S4 denote scanning signal waveforms of respective scanning signal lines S1~S4 in FIG. 7, and I1, I2 represent information signal waveforms of respective information signal lines i1, i2 in FIG. 7. Further, (I1-S3) represents a resultant waveform obtained by combining the information signal waveform I1 and the scanning signal waveform S3, and (I2-S2) represents a resultant waveform obtained by combining the information signal waveform I2 and scanning signal waveform S2. The FLC switches when the effective voltage of a voltage pulse applied to the liquid-crystal layer exceeds a threshold value. For example, according to the resultant waveform of (I1-S3), the FLC is switched to black by a pulse P1 and is not switched thereafter, as a result of which this pixel becomes black. According to the resultant waveform of (I2-S2), the FLC is switched to black by a pulse P2 and is switched again by a pulse P3, as a result of which this pixel becomes white.

Unlike other liquid-crystal displays, an FLCD has a memory capacity according to which the liquid crystal retains its display state even after scanning has been performed by the above-described driving waveforms. As a result, luminance does not attenuate gradually after scanning, as in the manner of a CRT, and therefore the occurrence of flicker is diminished even at low frame frequencies. However, with a display having a simple matrix structure such as an FLCD, crosstalk is produced depending upon the display pattern and, in the case of an FLCD using the above-described driving waveforms, there are instances where the luminance of a scanning line not currently being scanned (namely an unselected scanning line) changes. If this change in luminance is repeated at a frequency of less than 50 Hz, flicker will occur.

Figure 8:
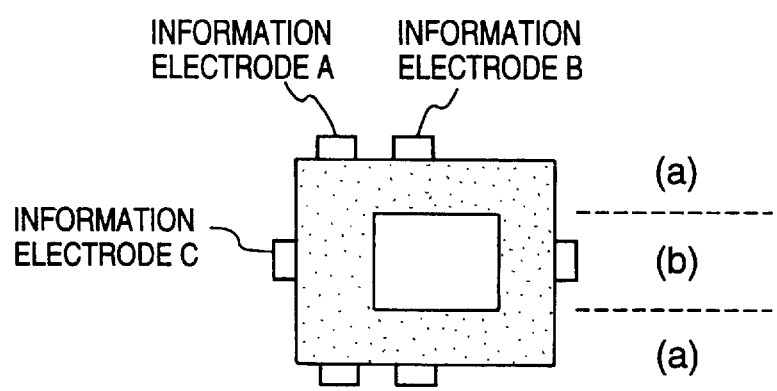
FIG. 8 is a diagram showing an example of a display pattern in which a difficulty arises when display control is carried out by a display control method according to the prior art.

The principle according to which flicker is caused by crosstalk produced in an FLCD when the above-mentioned driving waveforms are used will now be described. Assume that the FLC panel 34 is displaying, as a display pattern, a picture in which a white rectangle of one-fourth the size is placed at the center of a black background, as shown in FIG. 8. This display pattern is one example of a pattern in which crosstalk tends occur. The crosstalk produced when such a pattern is displayed as well as the mechanism through which flicker is produced will be described below.

Only two information-line electrodes, namely information electrodes A and B, are shown in FIG. 8. Assume that when scanning of one frame of the above-described display pattern is performed, the information electrode A always outputs a black information signal and the information electrode B outputs a black information signal during the scanning of area (a) in FIG. 8 and a white information signal during the scanning of an area (b).

Figure 9A:
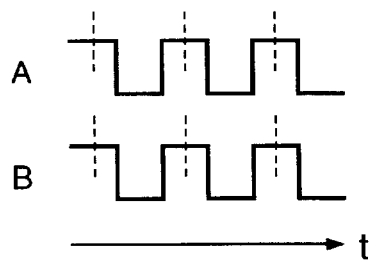
FIGS. 9A to 9F are diagrams showing waveforms produced on information electrodes in a case where the display pattern of FIG. 8 is subjected to non-interlaced scanning.

FIG. 9A illustrates the output waveforms on information electrodes A and B when the area (a) in FIG. 8 is being scanned. Further, assume that the waveform of an induced voltage produced at a scanning electrode of the liquid-crystal panel not currently being scanned (namely an unselected scanning electrode C) is as shown in FIG. 9B, and that the waveforms of the potential differences produced across the information electrodes and the unselected scanning electrode at this time are as shown in FIG. 9C.

Figure 9D:
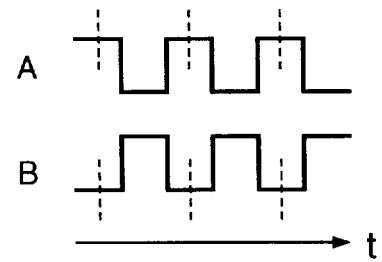
Figure 9B:
Figure 9E:
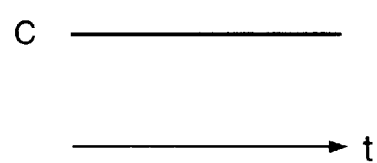

FIG. 9D illustrates the output waveforms on information electrodes A and B when the area (b) in FIG. 8 is being scanned. Further, assume that the waveform of an induced voltage produced at a scanning electrode of the liquid-crystal panel not currently being scanned (namely the unselected scanning electrode C) is as shown in FIG. 9E, and that the waveforms of the potential differences produced across the information electrodes and the unselected scanning electrode at this time are as shown in FIG. 9F.

Figure 9C:
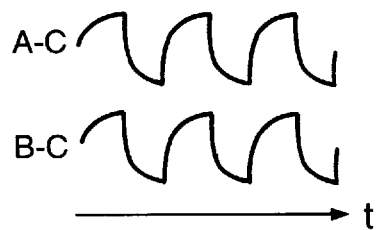
Figure 9F:
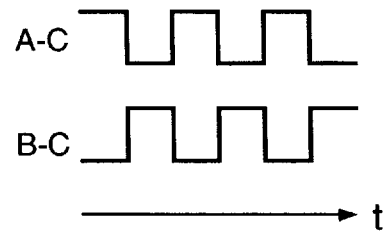

It will be understood from FIGS. 9C and 9F that the waveforms produced across the information electrodes and the unselected scanning electrode when the area (a) in FIG. 8 is being scanned differ from those which prevail when the area (b) in FIG. 8 is being scanned. It is known that although an FLC possesses a memory capability, the liquid-crystal molecules do oscillate somewhat even at a voltage value below the threshold value. Consequently, the manner in which the liquid-crystal molecules oscillate differs depending upon the difference between the waveform produced across the information electrode and the unselected electrode, and therefore a slight difference in the optical response is brought about.

Figure 10:
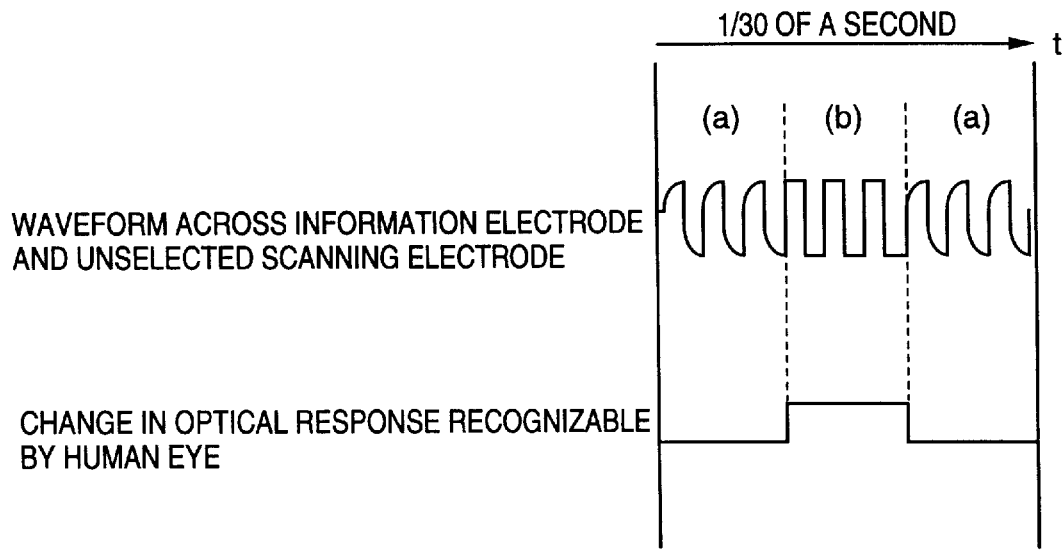
FIG. 10 is a diagram showing difficulties which arise when the display pattern of FIG. 8 is subjected to non-interlaced scanning.

Accordingly, the optical response when the area (a) in FIG. 8 is being scanned differs slightly from that which prevails when the area (b) is being scanned. This difference in optical response appears as flicker when it varies at low frequencies. FIG. 10 illustrates the waveform across an information electrode and an unselected scanning electrode in a case where the display pattern of FIG. 8 is displayed by non-interlacing, as well as the difference in optical response at such time. It will be appreciated that the optical response in the case of area (a) differs from that in the case of area (b).

The display control apparatus of the present invention is designed to solve the problem of flicker elaborated above. The display control algorithm of the display controller 28 will now be described on the basis of the flowchart shown in FIGS. 11 and 12.

When the display controller 28 receives the VSYNC signal from the timing controller 27 and determines that one frame of image processing has been completed by the image processing circuit 24, the controller 28 changes over the frame buffer 25 (step S1). More specifically, if results from the image processing circuit 24 have been written in the frame buffer (A) in FIG. 2 and data has been read out of the frame buffer (B) and delivered to the FLCD 30 so far, the frame buffer (B) is adopted as the write buffer and the frame buffer (A) as the read buffer. If results from the image processing circuit 24 have been written in the frame buffer (B) and data has been read out of the frame buffer (A) and delivered to the FLCD 30 so far, then the frame buffer (A) is adopted as the write buffer and the frame buffer (B) as the read buffer.

Next, at step S2, LPa=1, PPb=240, LPc=241, LPd=480 are set in respective line pointers LPa, LPb, LPc, LPd, which designate the line to be outputted to the FLCD 30. Assume that one picture on the FLC panel 34 is composed of 512 lines of from 1 to 512. A counter "count", which counts the output fields that have been outputted, is cleared at step S3.

Next, the display controller 28 receives the Status signal from the output I/F 26 at step S4, after which the controller 28 transfers the value of the line pointer LPa to the I/F 26 (step S5) and increments the line pointer LPa by one (step S6). After the FHSYNC signal from the FLCD 30 is received by the output I/F 26, the scanning-line address information of the line sent from the display controller 28 and the display data on this line are read out of the frame buffer 25 and outputted to the panel controller 31. After outputting the display data, the output I/F 26 sends the Status signal to the display controller 28 to inform it of the fact that setting of the line outputted next is possible.

Upon receiving the Status signal from the output I/F 26, the display controller 28 transfers the value of line pointer LPb to the output I/F 26 (step S8) and increments the line pointer LPb by one (step S9). Similarly, upon receiving the next Status signal (step S10), the display controller 28 transfers the value of line pointer LPc to the output I/F 26 (step S11) and increments the line pointer LPc by one (step S12). Upon receiving the next Status signal (step S13), the display controller 28 transfers the value of line pointer LPd to the output I/F 26 (step S14) and increments the line pointer LPd by one (step S15).

By virtue of the operation described above, the four lines 1, 240, 241, 480 set in the line pointers LPa~LPd initially are outputted. The period during which a plurality of lines indicated one line at a time by the line pointers are outputted shall be referred to as one output field.

When output of one output field ends, the display controller 28 increments the counter "count" which counts the output fields (step S16). If count<120 holds ("YES" at step S17), then output of the next output field (lines 2, 239, 242, 479 in this case) is performed. In this example, the lines outputted in each output field are as indicated in Table 1 below.

TABLE 1

| OUTPUT FIELD | LPa | LPb | LPc | LPd |
|---|---|---|---|---|
| OUTPUT FIELD 1 | 1 | 240 | 241 | 480 |
| OUTPUT FIELD 2 | 2 | 239 | 242 | 479 |
| OUTPUT FIELD 3 | 3 | 238 | 243 | 478 |
| OUTPUT FIELD 4 | 4 | 237 | 244 | 477 |
| OUTPUT FIELD 5 | 5 | 226 | 245 | 476 |
| . | | | | |
| . | | | | |
| OUTPUT FIELD 11 | 119 | 122 | 359 | 362 |
| OUTPUT FIELD 12 | 120 | 121 | 360 | 361 |

When count=120 is established and the output of the 120 output fields is finished, a transition is made to the output of the border area. In other words, after the next status signal is received (step S18), the output I/F 26 is instructed to output border data (black frame data) as the image data and the value of a line pointer BLP for the border is transferred to the output I/F 26 (step S19). According to this embodiment, the border area is the 481st to the 512th lines. The value of the line pointer BLP for the border, therefore, varies over a range of 481~512 and is incremented by one whenever the Status signal is received (step S20). When the value of the line pointer BLP exceeds "512" (step S22), the initial value "481" is set again (step S23).

When the VSYNC signal is received from the timing controller 27 (step S21), the output of the border area is suspended, the program returns to step S1 and the frame buffer 25 is changed over.

Figure 11:
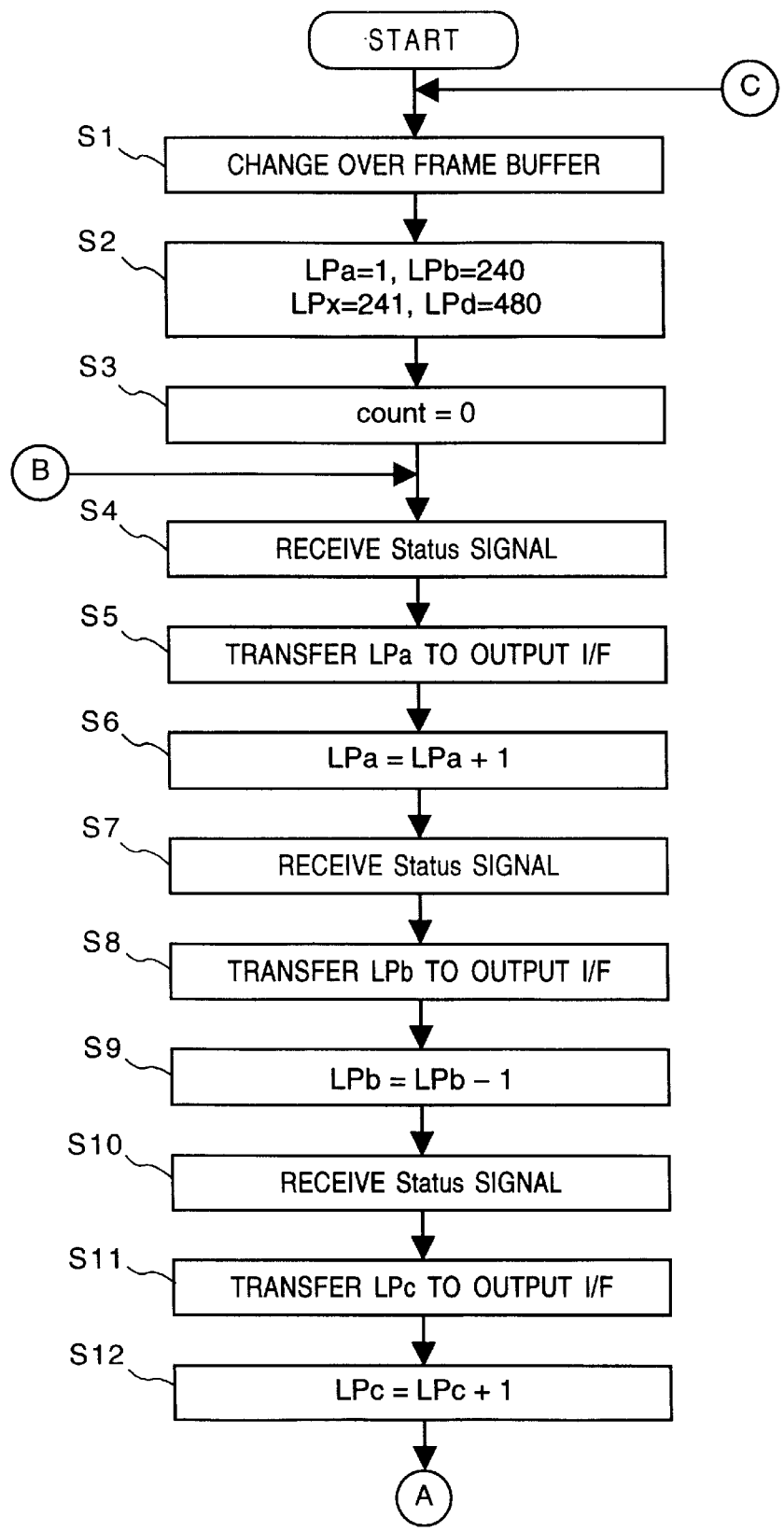
FIGS. 11 and 12 show a flowchart illustrating a display control algorithm according to this embodiment.
Figure 12:
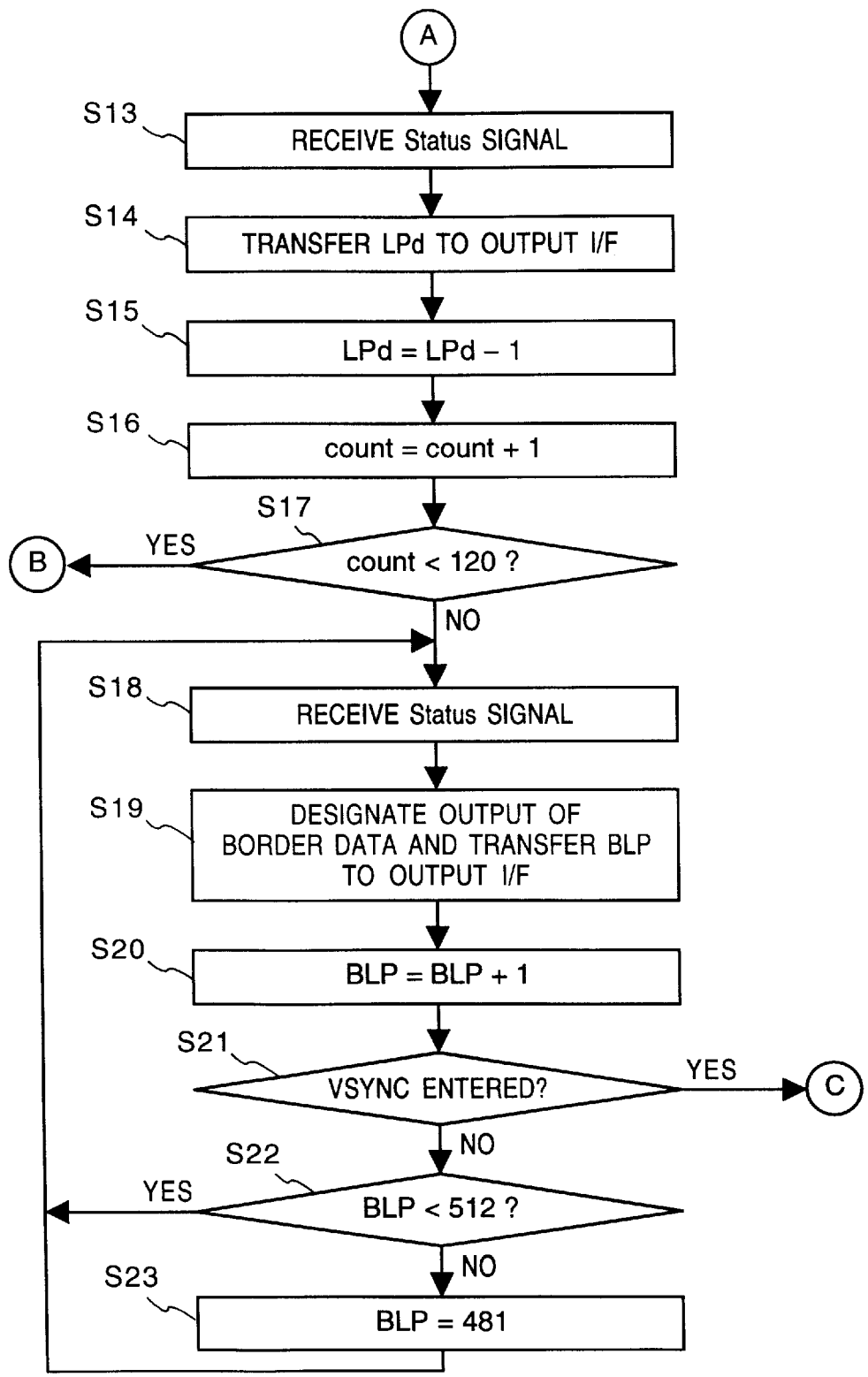
Figure 13:
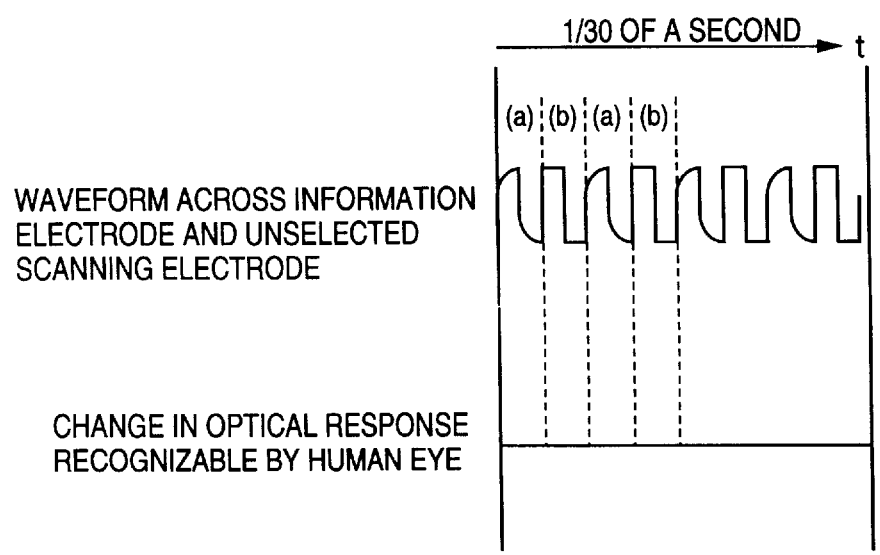
FIG. 13 is a diagram, which corresponds to FIG. 10, for a case where the display control algorithm of this embodiment is executed.

FIG. 13 illustrates the waveform of the potential difference produced across an information electrode and an unselected scanning electrode of the FLC panel 34 in a case where scanning is performed by the display control algorithm of FIGS. 11 and 12, as well as the difference in optical response at such time, when the pattern of FIG. 8 in which crosstalk readily occurs is displayed.

It should be apparent from FIG. 13 that when the display control algorithm of this embodiment is used, the waveform of the potential difference produced across the information electrode and the unselected scanning electrode is changed over at an extremely short period and the difference in the optical response is indistinguishable to the human eye. Accordingly, the occurrence of flicker which was a problem in the prior art is eliminated and a flicker-free display can be presented.

Figure 14A:
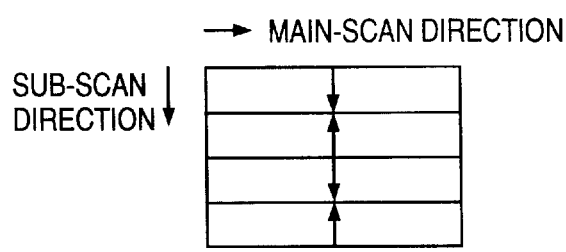
FIG. 14A is a conceptual view showing the details of processing of the display control algorithm according to this embodiment, in which 120 output fields is taken as an example.

In a case where this display control algorithm is executed, it is as if the image display area has been divided into four equal portions in the line direction (sub-scan direction) on the FLCD panel 34 and is if the direction in which scanning advances reverses from one block to the next, as shown in FIG. 14A. In this case, it is just as if scanning proceeds in non-interlaced fashion within each block, and therefore poor half-tone expression and display of an unattractive image do not occur, unlike the case were interlaced scanning is carried out. Furthermore, since the direction in which scanning proceeds reverses from one block to the next, the line serving as the boundary between the immediately preceding frame and the current frame constantly changes. This means that the image does not appear to be broken or intermittent even when a rapidly moving image is being displayed.

Figure 14B:
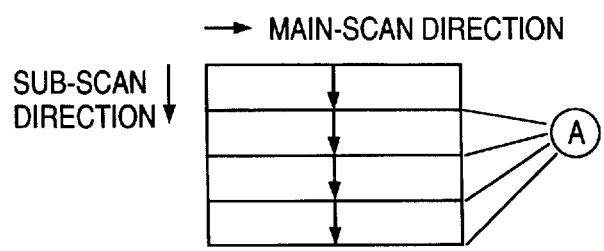
FIG. 14B is a conceptual view showing the details of processing of the display control algorithm according to the prior art.

FIG. 14B illustrates multiple interlaced scanning according to the prior art. In this case the boundary A between a preceding frame and a current frame is fixed, as a result of which the image is broken up.

Figure 15:
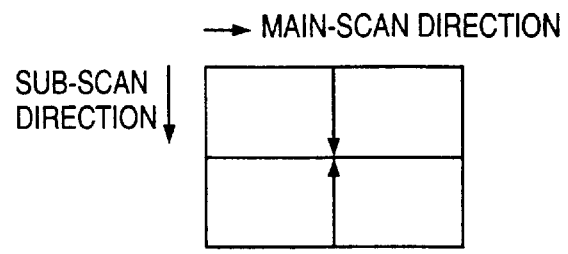
FIG. 15 is a conceptual view showing the details of processing of the display control algorithm of this embodiment in the case of 240 output fields.
Figure 16:
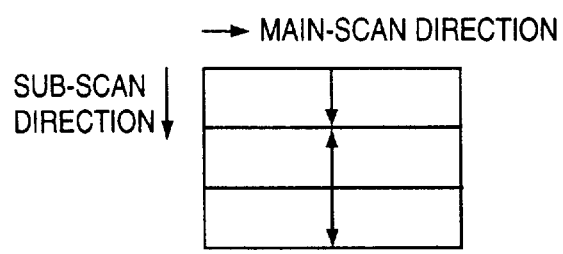
FIG. 16 is a conceptual view showing the details of processing of the display control algorithm of this embodiment in the case of 160 output fields.
Figure 17:
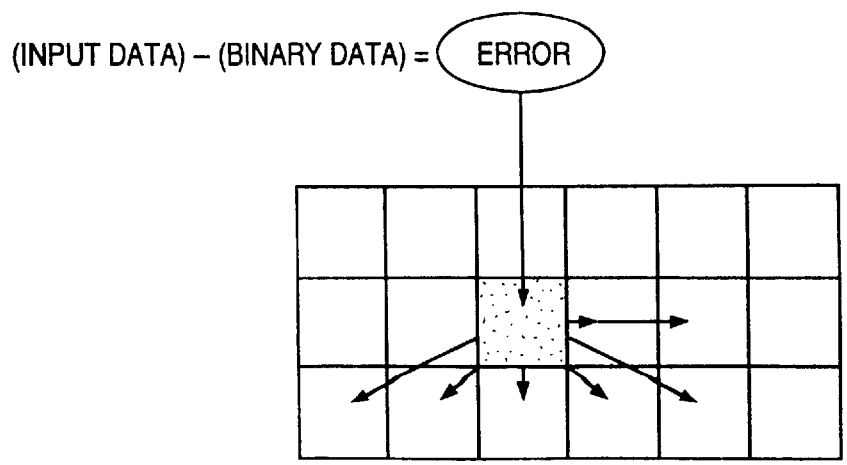
FIG. 17 is a diagram for describing the principles of error diffusion processing.
Figure 18:
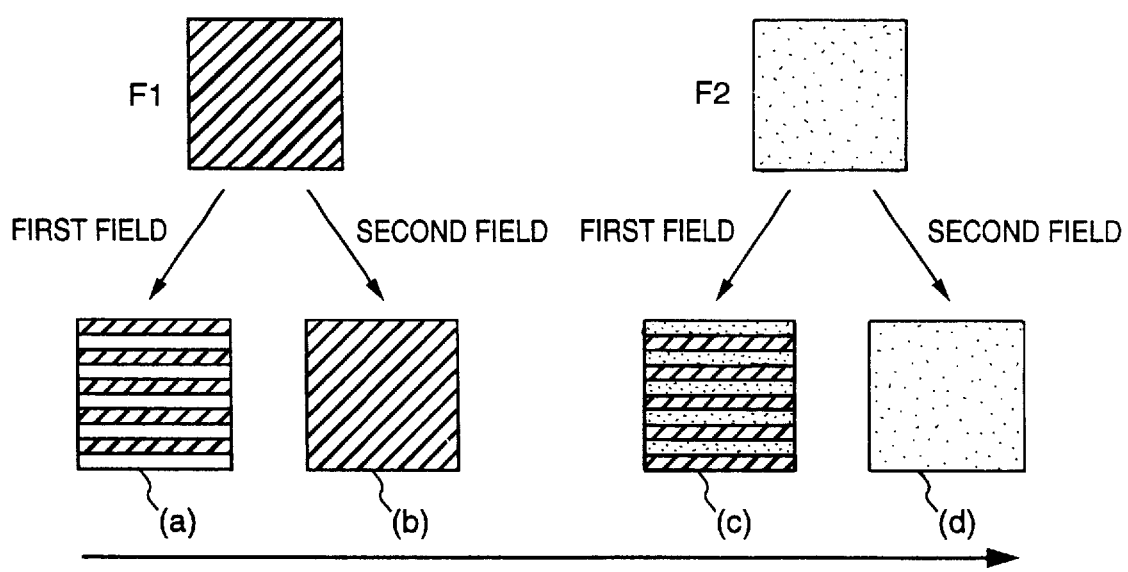
FIG. 18 is an explanatory view for describing problems that occur in a case where binary data that has been subjected to error diffusion processing in frame units is displayed on an FLCD by 2:1 interlaced scanning.

It should be noted that the invention is not limited to an arrangement in which an image display area is divided into four equal sections as 120 output fields. For example, the area may be divided into two sections as 240 output fields, as shown in FIG. 15, or into three sections as 160 output fields, as shown in FIG. 16.

The lines outputted in each output field in the case of 240 output fields are as indicated in Table 2 below.

TABLE 2

| OUTPUT FIELD 1 | 1 | 480 |
|---|---|---|
| OUTPUT FIELD 2 | 2 | 479 |
| OUTPUT FIELD 3 | 3 | 478 |
| OUTPUT FIELD 4 | 4 | 477 |
| OUTPUT FIELD 5 | 5 | 476 |
| . | | |
| . | | |
| OUTPUT FIELD 239 | 239 | 242 |
| OUTPUT FIELD 240 | 240 | 241 |

The lines outputted in each output field in the case of 160 output fields are as shown in Table 3 below.

TABLE 3

| OUTPUT FIELD 1 | 1 | 320 | 321 |
|---|---|---|---|
| OUTPUT FIELD 2 | 2 | 319 | 322 |
| OUTPUT FIELD 3 | 3 | 318 | 323 |
| OUTPUT FTELD 4 | 4 | 317 | 324 |
| OUTPUT FIELD 5 | 5 | 316 | 325 |
| . | | | |
| . | | | |
| OUTPUT FIELD 159 | 159 | 162 | 479 |
| OUTPUT FIELD 160 | 160 | 161 | 480 |

The description given above illustrates an example in which an NTSC-type TV image is displayed on an FLC panel composed of 1280 pixels horizontally and 1024 pixels vertically. However, this does not impose a limitation upon the invention. The present invention can be applied even if the number of pixels of the FLC panel differs from this example or even if the image is displayed not in accordance with the NTSC method but in accordance with the PAL scheme or SECAM scheme (both of which employ 625 scanning lines).

Thus, in accordance with the display control apparatus of the present invention as described above, display control is performed by multiple-field interlaced scanning, in which the image display area of a matrix display is divided into m-number of line groups in the sub-scan direction (where m is an integer an is equal to two or greater) and the m-number of line groups are scanned one line at a time in one field, with a line that is to be scanned being successively designated in such a manner that the direction in which sub-scanning (scanning in the vertical direction) advances within a group reverses from one line group to the next neighboring line group. As a result, image information can be displayed without inviting a deterioration in image quality or the occurrence of flicker.

More specifically, since the direction in which sub-scanning advances within a group reverses from one line group to the next neighboring line group, it possible to prevent flicker due to the occurrence of crosstalk, which is peculiar to a matrix display, depending upon the display pattern. Since scanning within each line group proceeds in the manner of non-interlaced scanning, poor half-tone expression and display of an unattractive image do not occur, unlike the case where interlaced scanning is performed. Furthermore, since the direction in which sub-scanning advances within a group reverses from one line group to the next neighboring line group, the line which is the boundary between the frame of an immediately preceding picture and a current frame changes constantly so that it possible to prevent an image from being displayed in an intermittent or interrupted manner even if the image is moving rapidly.

The present invention can be applied to a system constituted by a plurality of devices or to an apparatus comprising a single device.

Furthermore, the invention is applicable also to a case where the invention is embodied by supplying a program to a system or apparatus. In this case, a storage medium, storing a program according to the invention constitutes the invention. The system or apparatus installed with the program read from the medium realizes the functions according to the invention.

The present invention is not limited to the above embodiments and various changes and modifications can be made within the spirit and scope of the present invention. Therefore, to apprise the public of the scope of the present invention, the following claims are made.

What is claimed is:

1. A display control apparatus comprising:
    input means for entering image data;
    memory means for storing the entered image data;
    partitioning means for partitioning the image data stored in said memory means into a plurality of bands each composed of a plurality of lines of image data; and
    scanning means for performing non-interlaced scanning within each of the bands obtained by said partitioning means and performing interlaced scanning in band units,
    wherein said scanning means controls a scanning direction of a first band and a scanning direction of a second band neighboring the first band to be opposite of each other so that the first band is scanned in a first sub-scanning direction while the second band is scanned in a second sub-scanning direction opposite to the first sub-scanning direction.

2. The apparatus according to claim 1, wherein said input means enters a first field and a second field of multivalued image data, forms one frame of multivalued image data from the first field and second field of multivalued image data, converts the one frame of multivalued image data to binary image data by error diffusion processing and outputs the binary image data.

3. The apparatus according to claim 2, wherein said input means enters TV image data.

4. The apparatus according to claim 1, wherein said scanning means scans a ferroelectric liquid-crystal display.

5. A display control method comprising:
    an input step of entering image data;
    a storing step of storing the entered image data;
    a partitioning means for partitioning the image data stored at said storing step into a plurality of bands each composed of a plurality of lines of image data; and
    a scanning step of performing non-interlaced scanning within each of the bands obtained by said partitioning means and performing interlaced scanning in band units,
    wherein said scanning step controls a scanning direction of a first band and a scanning direction of a second band neighboring the first band to be opposite of each other so that the first band is scanned in a first sub-scanning direction while the second band is scanned in a second sub-scanning direction opposite to the first sub-scanning direction.

6. The method according to claim 5, wherein said input step includes steps of entering a first field and a second field of multivalued image data, forming one frame of multivalued image data from the first field and second field of multivalued image data, converting the one frame of multivalued image data to binary image data by error diffusion processing and outputting the binary image data.

7. The method according to claim 6, wherein said input step enters TV image data.

8. The method according to claim 5, wherein said scanning step scans a ferroelectric liquid-crystal display.

9. A display control apparatus for displaying an image on a matrix display, comprising:
    image memory means for storing at least one frame of image information; and
    a display controller for reading the image information, which has been stored in said image memory means, out of said memory means in line units and scanning said matrix display,
    wherein said display controller divides an image display area of said matrix display into m-number of line groups in a sub-scan direction (where m is an integer and is equal to or greater than two), scans each of the m-number of line groups one line at a time in one field and controls a scanning direction of a first line group and a scanning direction of a second line group neighboring the first line group to be opposite of each other so that the first line group is scanned in the sub-scan direction while the second line group is scanned in a direction opposite to the sub-scan direction.

10. The apparatus according to claim 9, wherein said matrix display is composed of a ferroelectric liquid-crystal display.

11. The apparatus according to claim 9, wherein said image information is digitized TV image information.

12. The apparatus according to claim 9, wherein said image information is image information that has been subjected to error diffusion processing in frame units. opposite of each other.

13. A display control apparatus for displaying an image on a matrix display, comprising:

image memory means for storing at least one frame of image information;

image input means for entering continuous image information and storing it in said image memory means;

display control means for successively designating lines to be scanned on said matrix display;

image output means for reading the image information of the line designated by said display control means out of said image memory means and transferring the image information to said matrix display; and scanning control means for displaying the line on said matrix display, designated by said display control means, based upon the image information transferred from said image output means, wherein said display control means divides an image display area of said matrix display into m-number of line groups in a sub-scan direction (where m is an integer and is equal to or greater than two), scans each of the m-number of line groups one line at a time in one field and successively designates lines to be scanned in such a manner that a scanning direction of a first line group and a scanning direction of a second line group neighboring the first line group are opposite of each other so that the first line group is scanned in the sub-scan direction while the second line group is scanned in a direction opposite to the sub-scan direction.

14. The apparatus according to claim 13, wherein said matrix display is composed of a ferroelectric liquid-crystal display.

15. The apparatus according to claim 13, wherein said image information is digitized TV image information.

16. The apparatus according to claim 13, wherein said image information is image information that has been subjected to error diffusion processing in frame units.

17. The apparatus according to claim 13, wherein said image memory means includes:

first and second frame memories each for storing one frame of image data; and frame memory changeover means for changing over an input/output mode of said first and second frame memories in such a manner that a frame memory which stores image information and a frame memory from which image information is read out are alternated whenever processing for storing one frame of image data in said first and second frame memories is performed.

18. The apparatus according to claim 13, wherein said image input means includes:

converting means for entering a TV signal in field units and converting it to digital image information;

a third frame memory for storing at least one frame of digital image information obtained by conversion by said converting means; and image processing means for reading frame data, which is a combination of first and second fields, out of said third frame memory and subjecting said frame data to error diffusion processing.

* * * * *

UNITED STATES PATENT AND TRADEMARK OFFICE
CERTIFICATE OF CORRECTION

PATENT NO. : 5,880,707

DATED : March 9, 1999

INVENTOR(S) : SHUNTARO ARATANI

It is certified that error appears in the above-identified patent and that said Letters Patent is hereby corrected as shown below:

COLUMN 7

Line 2, "a" should read --an--.

COLUMN 10

Line 10, "is if" should read --is as if--.

Line 15, "were" should read --where-.

COLUMN 11

Line 8, "an" (second occurrence) should read --and--.

Line 19, "it possible" should read --it is possible--.

Line 30, that it" should read --that it is--.

UNITED STATES PATENT AND TRADEMARK OFFICE
CERTIFICATE OF CORRECTION

PATENT NO. : 5,880,707

DATED : March 9, 1999

INVENTOR(S) : SHUNTARO ARATANI

It is certified that error appears in the above-identified patent and that said Letters Patent is hereby corrected as shown below:

COLUMN 12

Line 66, "opposite" should be deleted.

Line 67, "of each other." should be deleted.

Signed and Sealed this

Fourteenth Day of December, 1999

Attest:

Attesting Officer

Q. TODD DICKINSON

Acting Commissioner of Patents and Trademarks